US009824313B2

(12) United States Patent
Griesmeyer (10) Patent No.: US 9,824,313 B2
(45) Date of Patent: Nov. 21, 2017

(54) FILTERING CONTENT IN AN ONLINE SYSTEM BASED ON TEXT AND IMAGE SIGNALS EXTRACTED FROM THE CONTENT

(71) Applicant: Flipboard, Inc., Palo Alto, CA (US)

(72) Inventor: Robert Griesmeyer, San Francisco, CA (US)

(73) Assignee: Flipboard, Inc., Palo Alto, CA (US)

( * ) Notice: Subject to any disclaimer, the term of this patent is extended or adjusted under 35 U.S.C. 154(b) by 166 days.

(21) Appl. No.: 14/702,363

(22) Filed: May 1, 2015

(65) Prior Publication Data

US 2016/0323281 A1 Nov. 3, 2016

(51) Int. Cl.
| | |
|---|---|
| *H04L 29/06* | (2006.01) |
| *G06N 7/00* | (2006.01) |
| *G06N 99/00* | (2010.01) |
| *G06F 17/30* | (2006.01) |

(52) U.S. Cl.
CPC ............ *G06N 7/005* (2013.01); *G06F 17/30* (2013.01); *G06N 99/005* (2013.01)

(58) Field of Classification Search
None
See application file for complete search history.

(56) References Cited

U.S. PATENT DOCUMENTS 6,895,111 B1 * 5/2005 Swift ................. G06F 17/3025
382/118
8,478,052 B1 * 7/2013 Yee ...................... G06K 9/4676
382/155

8,787,683 B1 * 7/2014 Yee ...................... G06K 9/4676
382/155

(Continued)

FOREIGN PATENT DOCUMENTS

| CN | 101923652 B | 5/2012 |
| KR | 20100030300 | 3/2010 |

OTHER PUBLICATIONS

Liu, Y., et al., "Architecture Research and Design for the Internet Content Rating Implementation System," 2010 Second International Workshop on Education Technology and Computer Science, 2010, pp. 396-401.

*Primary Examiner* — Christopher Revak
(74) *Attorney, Agent, or Firm* — Fenwick & West LLP (57) ABSTRACT

The disclosure relates (a) a method and computer program product for training a content classifier and (b) a method and computer program product for using the trained content classifier to determine compliance of content items with a content policy of an online system. A content classifier is trained using two training sets, one containing NSFW content items and the other containing SFW content items. Content signals are extracted from each content item and used by the classifier to output a decision, which is compared against its known classification. Parameters used in the classifier are adjusted iteratively to improve accuracy of classification. The trained classifier is then used to classify content items with unknown classifications. Appropriate action is taken for each content item responsive to its classification. In alternative embodiments, multiple classifiers are implemented as part of a two-tier classification system, with text and image content classified separately.

16 Claims, 6 Drawing Sheets

(56) References Cited

U.S. PATENT DOCUMENTS

| | | | |
|---|---|---|---|
| 8,788,442 B1* | 7/2014 | Sculley, II | G06N 99/005 |
| | | | 706/20 |
| 9,380,356 B2 | 6/2016 | McMillan et al. | |
| 9,418,310 B1* | 8/2016 | Chen | G06K 9/4638 |
| 9,471,851 B1* | 10/2016 | Cao | G06F 17/2785 |
| 2002/0159630 A1 | 10/2002 | Buzuloiu et al. | |
| 2003/0004966 A1* | 1/2003 | Bolle | G06F 17/30253 |
| 2008/0002893 A1* | 1/2008 | Vincent | G06K 9/3258 |
| | | | 382/229 |
| 2008/0002916 A1* | 1/2008 | Vincent | G06K 9/3258 |
| | | | 382/305 |
| 2008/0172412 A1* | 7/2008 | Gruhl | G06Q 10/00 |
| 2008/0219495 A1 | 9/2008 | Hulten et al. | |
| 2009/0064323 A1* | 3/2009 | Lin | H04L 12/585 |
| | | | 726/22 |
| 2009/0123064 A1 | 5/2009 | Gibbs | |
| 2009/0232413 A1 | 9/2009 | Songhurst | |
| 2011/0047388 A1 | 2/2011 | Park et al. | |
| 2011/0142346 A1* | 6/2011 | Han | G06K 9/00221 |
| | | | 382/190 |
| 2011/0150328 A1* | 6/2011 | Han | G06K 9/00664 |
| | | | 382/165 |
| 2014/0198982 A1 | 7/2014 | Dinerstein et al. | |
| 2015/0023552 A1 | 1/2015 | Rosen | |
| 2015/0125074 A1 | 5/2015 | Yu et al. | |
| 2015/0221097 A1 | 8/2015 | Yu et al. | |
| 2015/0319138 A1 | 11/2015 | Yan et al. | |
| 2016/0012213 A1 | 1/2016 | Walsh | |
| 2016/0350675 A1* | 12/2016 | Laks | G06N 99/005 |

* cited by examiner

300  Content Item *n*  310

Lorem ipsum dolor sit amet, consectetur adipiscing elit.  320

330

340

Curabitur ornare purus
350

Face detected
Skin tone detected
Text detected in content item

| $t_1, t_2, t_3, ... t_n$ | $i_1, i_2, i_3, ... i_n$ |
|---|---|
| Text signals 360 | Image signals 370 |

FILTERING CONTENT IN AN ONLINE SYSTEM BASED ON TEXT AND IMAGE SIGNALS EXTRACTED FROM THE CONTENT

BACKGROUND

This invention relates generally to online content systems, and in particular to filtering content in an online system based on text and image signals extracted from the content.

A digital magazine application for a computing device (such as a mobile communication device, tablet, computer, or any other suitable computing system) provides a personalized, customizable digital magazine for a user. Based on selections made by the user and/or on behalf of the user, the digital magazine contains and displays a personalized collection of content from a number of sources, thereby providing a useful interface by which the user can consume content that interests and inspires the user.

Some of the content curated and displayed by a digital magazine may be considered inappropriate for viewing in a working or professional environment. This content is sometimes called "not safe for work" (NSFW). Text and/or images that contain offensive language, profanity, and nudity/pornography are commonly considered to be NSFW. Effective content management for a digital magazine requires the ability to (i) identify and tag NSFW content and (ii) give users the option to block or hide the NSFW content.

SUMMARY

Embodiments of the invention include a software method and system for determining compliance of content with a content policy of an online content system. A trained model is used to identify NSFW content. The model is trained using two sets of content items: one set containing content items (comprised of text and/or images) that are known to be safe for work (SFW), and another set containing content items that are known to be NSFW. For each content item in each training set, text and image signals (collectively referred to as content signals) are extracted. Content signals represent a quantitative measure of the relevant features in a content item, such as the presence of particular words or word pairs, detection of a face or other body part, or the proportion of an image which is consistent with human skin tones. These signals are inputted into the untrained model, which performs one or more computations and arrives at a confidence value expressing a likelihood of compliance. This confidence value is translated to a classification decision, which can be compared against the known classification of each content item. Based on this comparison, one or more parameters involved in the model computation are optimized. Parameter optimization may be performed iteratively, with the content signals being processed by the model repeatedly until the accuracy of classification satisfies a given threshold. Once the model is trained, it is then used to classify actual content items as either SFW or NSFW. Content items identified as NSFW are then subjected to further action, including being blocked, forwarded to a manual reviewer for further scrutiny, or simply flagged and transmitted to a user.

In alternative embodiments, a two-tier classification system is implemented in which two separate first-level models classify text and image content separately, and a single second-level model outputs a final classification based on the outputs of the first-level models.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Content Items in a Web Environment

A typical web environment contains text and image information that is accessible through a variety of means to a user accessing the Web through a client application. This text and image information could be news, entertainment, video, or other types of data commonly made available on the Web. Text and image information can be thought of as a collection of content items, where each content item is a discrete object comprising text, one or more images, or a combination of both.

Individual content items can be made available to a user via a content platform, executing as a client application on a client device. One embodiment of a content platform is a digital magazine, which allows users to browse through and view content items in a format similar to physical magazines. In such a content platform or system, a rule or standard pertaining to the quality of individual content items may be enforced. This rule or standard is known as a content policy and may consist of specific restrictions on particular types of content items. Typically, the restrictions implemented by a content policy are context-sensitive. For example, a content system meant to be accessed or viewed in an office may restrict content that contains offensive language, profanity, or nudity/pornography. This type of content is collectively referred to as "not safe for work" or NSFW. In another example, individuals users or groups of users may have content policies or standards for what is considered NSFW, and they may implement those policies or standards by providing a NSFW content training set or by selecting a threshold confidence value for a NSFW classifier to classify content items as NSFW.

The content platform or system may feature a content system back-end or database which accesses, stores, and makes available the plurality of content items in the web environment. In order to enforce the content policy of the content system, a NSFW filter may be implemented. This NSFW filter may be implemented as a trained classifier, and is capable of identifying content items that fail to comply with the content policy of the online system. The NSFW filter may be implemented in such a way as to access individual content items from the content system back-end/database, and for each content item determine its compliance with the content policy of the online system and take appropriate action.

Figure 1:
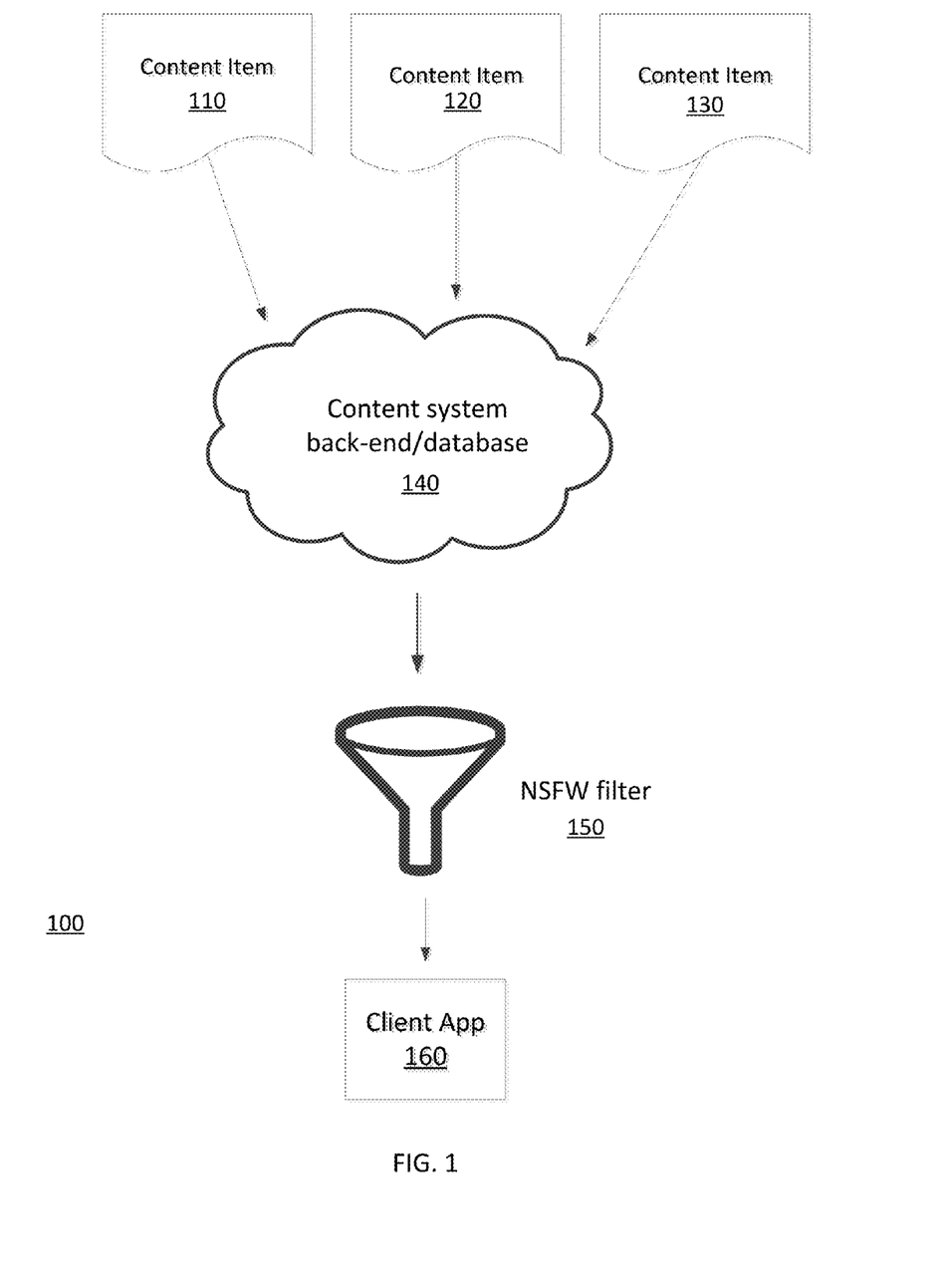
FIG. 1 illustrates a typical implementation of an NSFW filter in a web environment, according to one embodiment.

FIG. 1 illustrates a typical web environment, according to the previously described embodiment. The environment 100 comprises three content items 110, 120, and 130, a content system back-end (or database) 140, an NSFW filter 150, and a client application 160. Each of the content items 110, 120, and 130 comprises text and/or images as described previously. The content system back-end 140 stores or otherwise accesses the content items 110, 120, and 130. The content system back-end 140 may provide or otherwise transmit the content items 110, 120, and 130 to the NSFW filter 150, which determines the compliance of each of the content items with a content policy of an online system. Finally, the NSFW filter 150 transmits some or all of the classified content items to the client application 160. The NSFW filter 150 may transmit to the client application 160 only the content items which comply with the content policy. Alternatively, the NSFW filter 150 may transmit all of the content items to the client application 160, which may carry out further actions responsive to the classification of each content item.

Extracting Content Signals from Training Sets

As described in the previous embodiment, the NSFW classifier model ("model") is trained before it is used to determine compliance of content items with a content policy of an online system. This may be accomplished using two training sets, each containing a plurality of content items. One training set contains content items known to be NSFW, and the other training set contains content items known to be safe for work (SFW). Alternatively, a training set with only NSFW content may be used. For each content item in each training set, content signals may be extracted. These content signals may comprise quantitative information pertaining to the text and/or image content of the content item and are typically represented as an n-dimensional vector of information, where each value in the vector corresponds to a quantitative measure relevant to the content item. Content signals from each of the content items may be grouped together to form a signal collection. Because the content signals are extracted from content items for which the classification is known (either NSFW or SFW), the classification for each content item may also be included in the signal collection. The signal collection may then be used to train the model.

Figure 2:
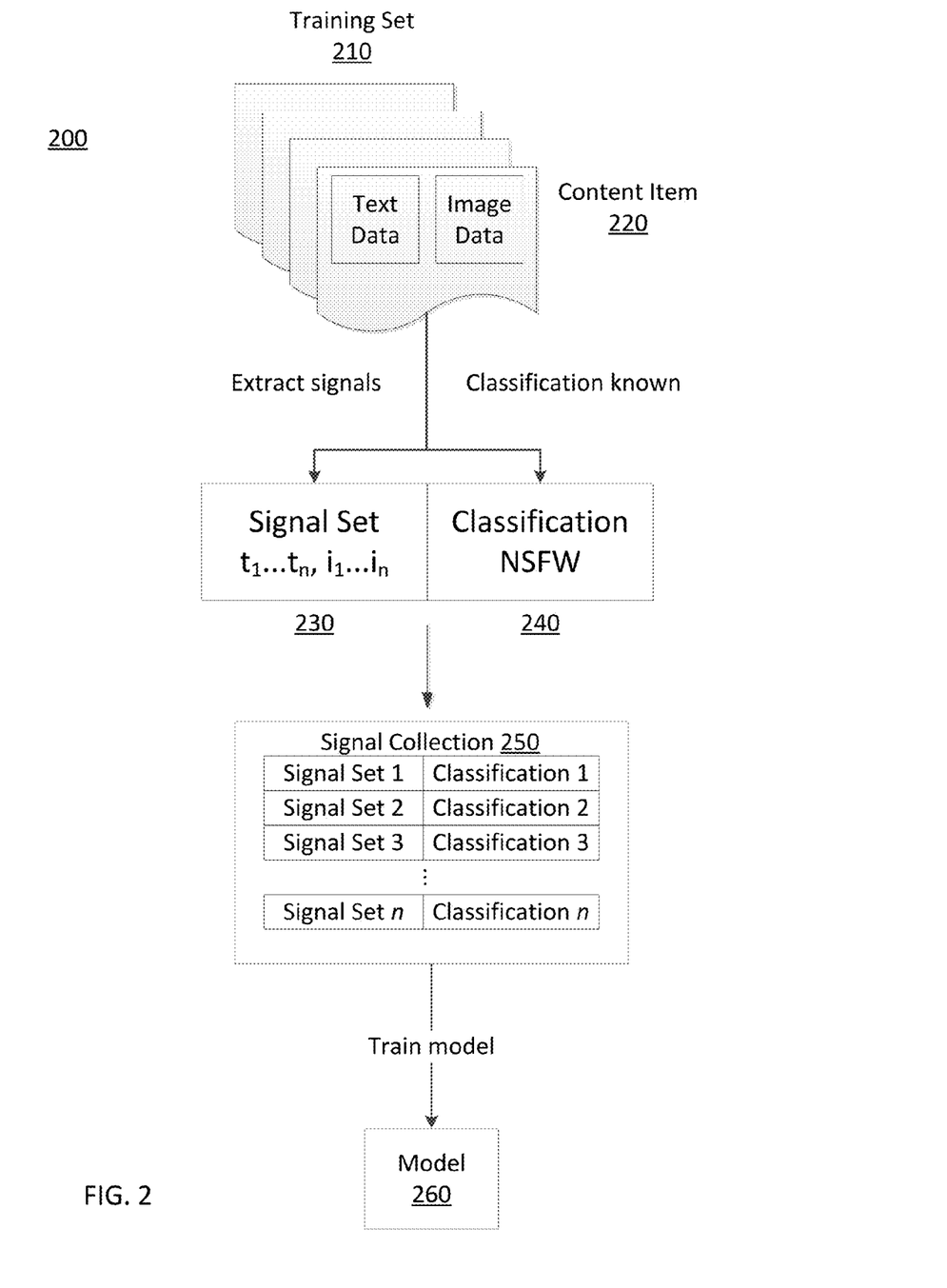
FIG. 2 illustrates a method of extracting content signals from a training set, according to one embodiment.

FIG. 2 illustrates a method of extracting content signals from a training set, according to the previously described embodiment. The environment 200 comprises a training set 210 comprising one or more content items 220, a signal set 230, a classification 240, a signal collection 250, and a model 260. Initially, the content items 220 in the training set 210 comprise text and/or images, as previously described. Each of these content items 220 has a known classification. From each content item 220, the corresponding signal set 230 is extracted. The information contained in the signal set 230 describes one or more quantitative parameters describing text and image content contained within the content item 220. Additionally, the known classification 240 is also extracted from the content item. 220. The classification 240 may be either "not safe for work" (NSFW) or "safe for work" (SFW). Combining the signal set 230 and known classification 240 from each content item 220, the signal collection 250 is constructed. The signal collection 250 is then used to train the model 260.

Information Contained in a Content Signal

As described in previous embodiments, a particular content item may contain text and/or images. Both may be analyzed to detect relevant information pertaining to the compliance nature of the content item. In one typical embodiment, a content item may contain one image and an associated collection of text. This collection of text may be a caption that goes with the image. Additionally, the image itself may contain text. An image and/or text processing algorithm or application may analyze the image and the text for information that can be inputted into a content signal in quantitative form, such as binary flags or discrete values. One example of a text signal might be whether one or more of a finite list of offensive or inappropriate words is detected in the text caption or in the image. Another example, this time of an image signal, may be whether a face or other body feature is detected in the image, or the proportion of the image that is consistent with human skin tones. The image processing algorithm or application may set a flag if the skin tone proportion exceeds a predetermined value. Each of these relevant text and image signals, including but not limited to the examples described above, are combined to form one or more content signal vectors that may then be processed by an NSFW model.

In some embodiments, the text and image signals extracted from a content item can include more complex or nuanced details pertaining to the content item. For example, two words found in a content item may have a combined meaning that differs from the individual meaning of each word alone. In such a situation, a text signal may indicate that a particular word pair is detected in a content item, especially if that word pair has an NSFW connotation.

Figure 3:
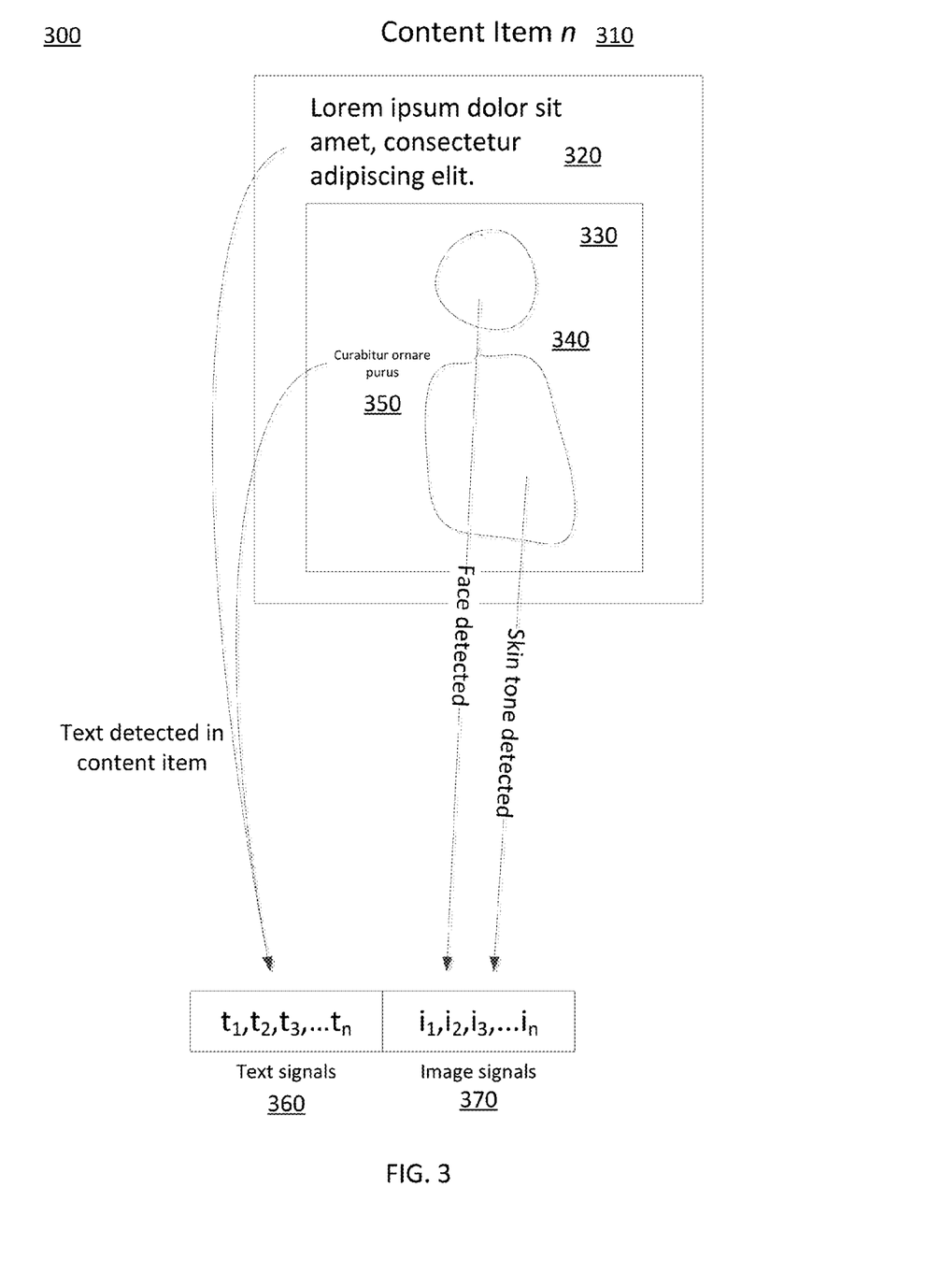
FIG. 3 illustrates an example content item and its associated content signal vectors, according to one embodiment.

FIG. 3 illustrates an example content item and its associated content signal vectors, according to the previously described embodiments. The environment 300 comprises: a content item n 310, within which is a collection of text 320; an image 330, the image 330 comprising one or more image features 340 and embedded text collection 350; and text signals 360 and image signals 370. A signal extraction application may scan or otherwise analyze the content item n 310 to detect the text items 320 and 350, the presence of the image 330, and the presence of any image features 340. All text information that is detected is used to construct the text signals 360, which comprises one or more quantitative metrics describing the text present in the content item n 310. Likewise, the image 330 and the image features 340 contained therein are used to construct the image signals 370, which comprises one or more parameters describing the image. Some examples of the information include in the image signals 370 are: whether a face is detected in the image 330 (as is depicted), and the proportion of the image which is consistent with human skin tones.

Iterative Training of an NSFW Classification Model Via Parameter Optimization

A classifier model used as an NSFW filter may perform one or more calculations to arrive at a compliance determination for a particular content item. This computation involves an input signal vector comprising text and/or image signals, as well as a vector comprising one or more parameters. As part of training the model, these parameters are optimized to ensure accurate classification of content items.

In one typical embodiment, model parameters are optimized iteratively. A training set containing NSFW content items and a training set containing SFW content items are both provided. A signal extraction application or algorithm may extract, from each content item in each training set, a content signal vector comprising text and/or image signals. These text and/or image signals are then inputted in the classification model, which computes and outputs a classification decision for each content item. Because each content item has a known classification (either NSFW or SFW), the classification decision outputted by the model can then be compared against the known classification. Typically, the classification model may correctly classify some content items and incorrectly classify other content items. Based on this comparison, the model parameters may be adjusted iteratively to improve the accuracy of classification. In some situations, multiple training "rounds" may be required in order for the classification accuracy of the model to satisfy a predetermined threshold. Once the classifier's accuracy exceeds the threshold, the classifier is considered trained and can be used to determine the compliance of actual content items with unknown classifications.

Figure 4:
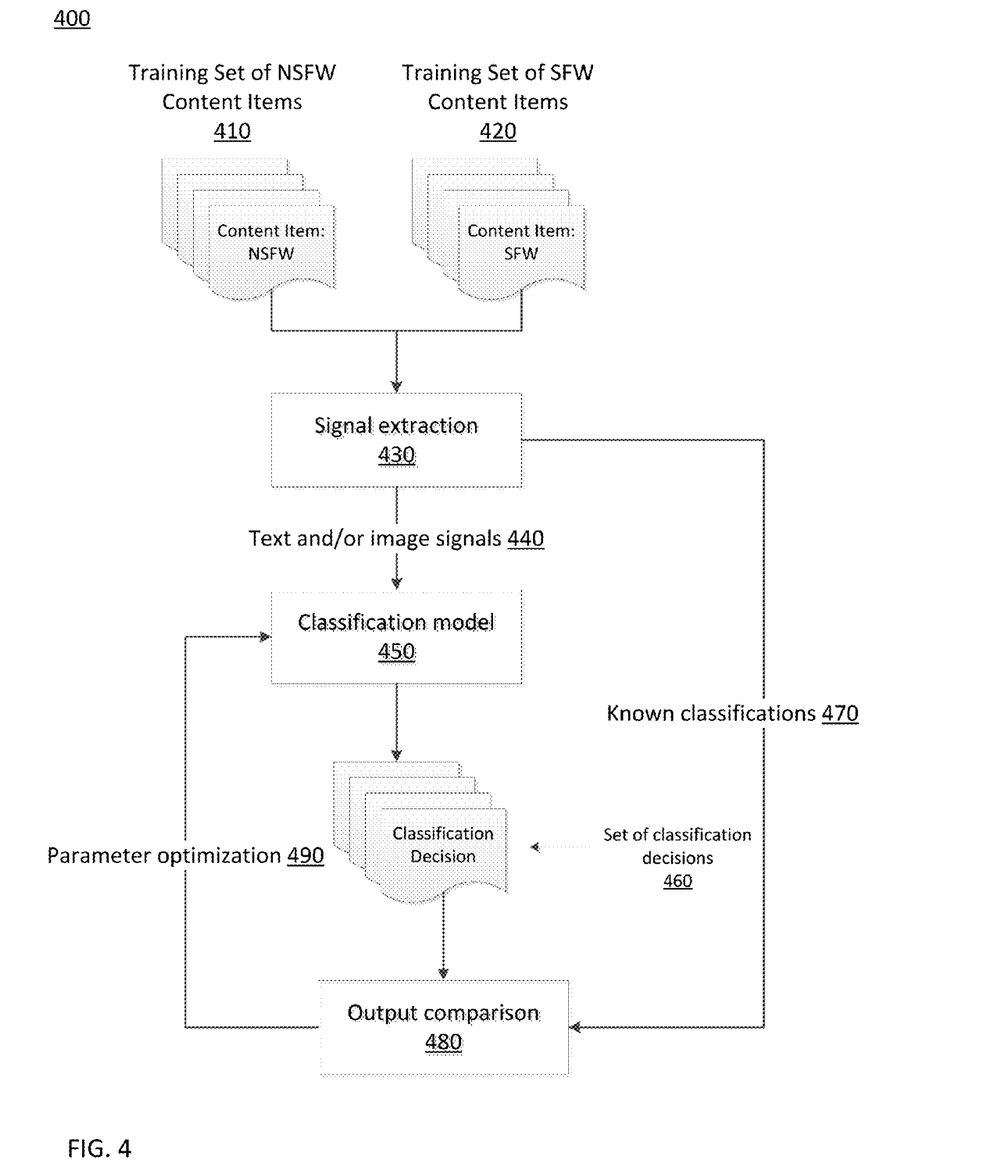
FIG. 4 illustrates a method of training a content classification model, according to one embodiment.

FIG. 4 illustrates a method of training a content classification model, according to the previously described embodiment. The environment 400 comprises: a training set of NSFW content items 410, a training set of SFW content items 420, a signal extraction process step 430, text and/or image signals 440, a classification model 450, a set of classification decisions 460, a set of known classifications 470, an output comparison step 480, and a parameter optimization step 490. First, the training set of NSFW content items 410 and the training set of SFW content items 420 are subjected to the signal extraction process 430. The results of this process are the text and/or image signals 440. These text and/or image signals are then inputted into the classification model 450, which produces the set of classification decisions 460. Recall that for each content item in each of the training sets, the classification is known; therefore, the known classifications 470 are accessed from the training sets during the output comparison step 480. The classification decision for each content item is compared against its known classification. Based on this comparison, the parameter optimization step 490 is carried out to improve the accuracy of the classification model 450.

In other embodiments, a classifier may be implemented that does not require the iterative parameter optimization illustrated in FIG. 4. One example of such a classifier is a Naïve-Bayes classifier, which applies Bayes' theorem of conditional probability with a strong assumption of independence between individual input features. This and other classifiers may be trained by using the method of maximum-likelihood estimation to determine the parameters.

Classifying a Content Item Using a Trained Model

Once a classifier model has been trained, whether by an iterative parameter optimization process as previously described or by other methods, it can be used to classify actual content items with unknown classification. For each such content item, a signal extraction process is performed, which outputs text and/or image signals as previous described. In some embodiments, these text and image signals may be contained in a single content signal vector. In other embodiments, they may be contained separately, with one vector for text signals and another vector for image signals. Regardless of the method in which text and image signals are represented, they are inputted into the trained model. The model then performs one or more computations using the inputted content signals, and outputs a classification decision. In some embodiments, the classification decision may take the form of a confidence value expressing a likelihood of compliance with the associated content policy of the content system in which the model is implemented. Further, the confidence value may be compared against a predetermined threshold value which may be specified an administrator of the content system. If the confidence value exceeds the threshold value, then the content item may be classified as NSFW, and as SFW if it does not. Responsive to the classification of the content item, multiple actions may be taken. If the content item is classified as SFW, it may be marked as such and forwarded to a client application. If the content item is classified as NSFW, then it may be blocked outright. It may also be forwarded to a manual reviewer for further scrutiny. In other embodiments, no action may be taken other than to mark the content item as NSFW before forwarding it to a client application.

Figure 5:
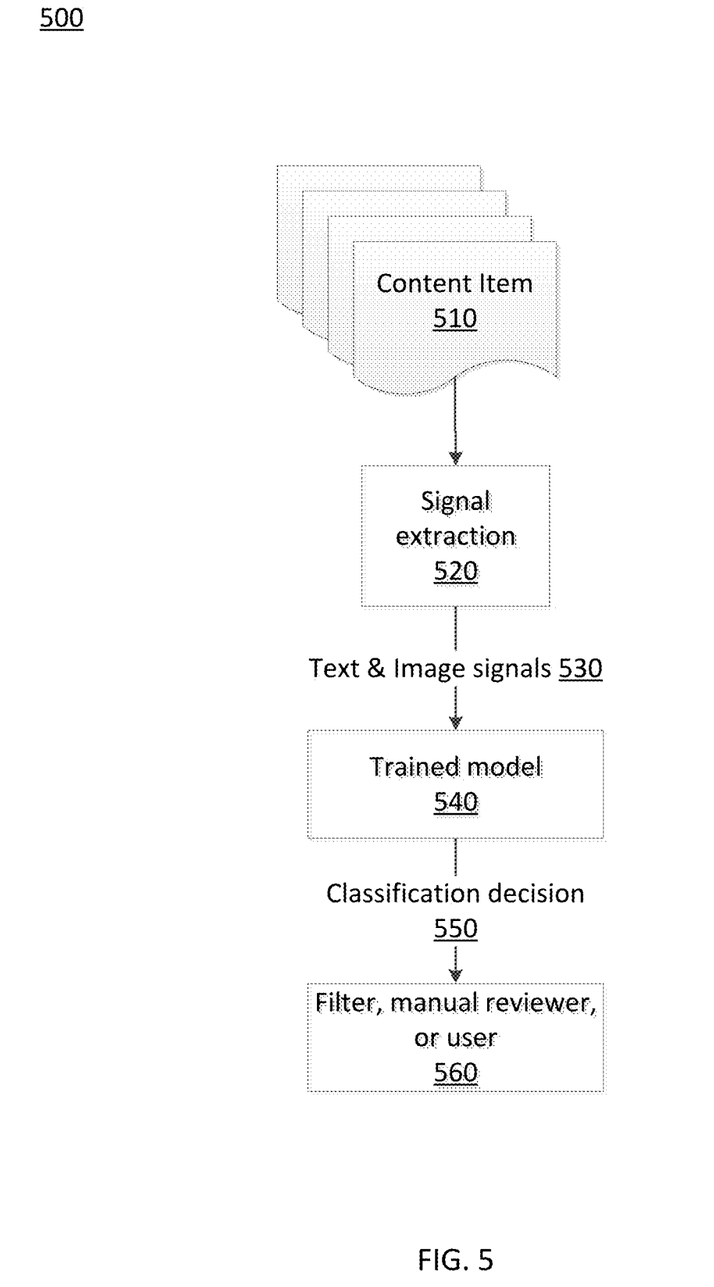
FIG. 5 illustrates a method of classifying an example content item using a single classification model, according to one embodiment.

FIG. 5 illustrates a method of classifying an example content item using a single classification model, according to one embodiment. The environment 500 contains a content item 510, a single extraction step 520, text and/or image signals 530, a trained model 540, a classification decision 550, and a final action step 560. First the content item 510, with unknown classification, undergoes the signal extraction process 520, resulting in the text and/or image signals 530. These signals are inputted into the trained model 540, which outputs the corresponding classification decision 550. Based on the classification decision, the final action 560 is taken. This may include filtering the content item 510 if its classification decision 550 is NSFW, or forwarding it to a manual reviewer for further scrutiny. Alternatively, the content item 510 may be flagged and forwarded to a user. If the content item 510 is classified as SFW, then no action is taken and it is transmitted directly to the user.

Classifying a Content Item Using Separate Trained Models

In another embodiment, a content item may be classified using a system comprising multiple classification models. This system may be organized in two tiers, with the first tier comprising a trained text classifier model and a trained image classifier model. The second tier may consist of a single classifier model, which takes as inputs the output values of the two separate classifiers in the first tier, performs a computation, and outputs a final confidence value or classification decision. This system of split classifier models may be advantageous over the previously described single-classifier systems in situations where content items are composed from distributed text and image sources. In content systems where this is the case, it may be useful to separately classify text and image elements to allow for more efficient combination or rearrangement of content items. Two-tier classifier systems may still be implemented in such a way as to keep the classification process unchanged from the perspective of a client application. Just like systems comprising a single trained classifier model, the trained second-level classifier will output a confidence value. This confidence value can be translated into a classification decision, and the same procedure can be implemented in which the content item is blocked, forwarded for further review, or flagged and transmitted as is described in previous embodiments.

Figure 6:
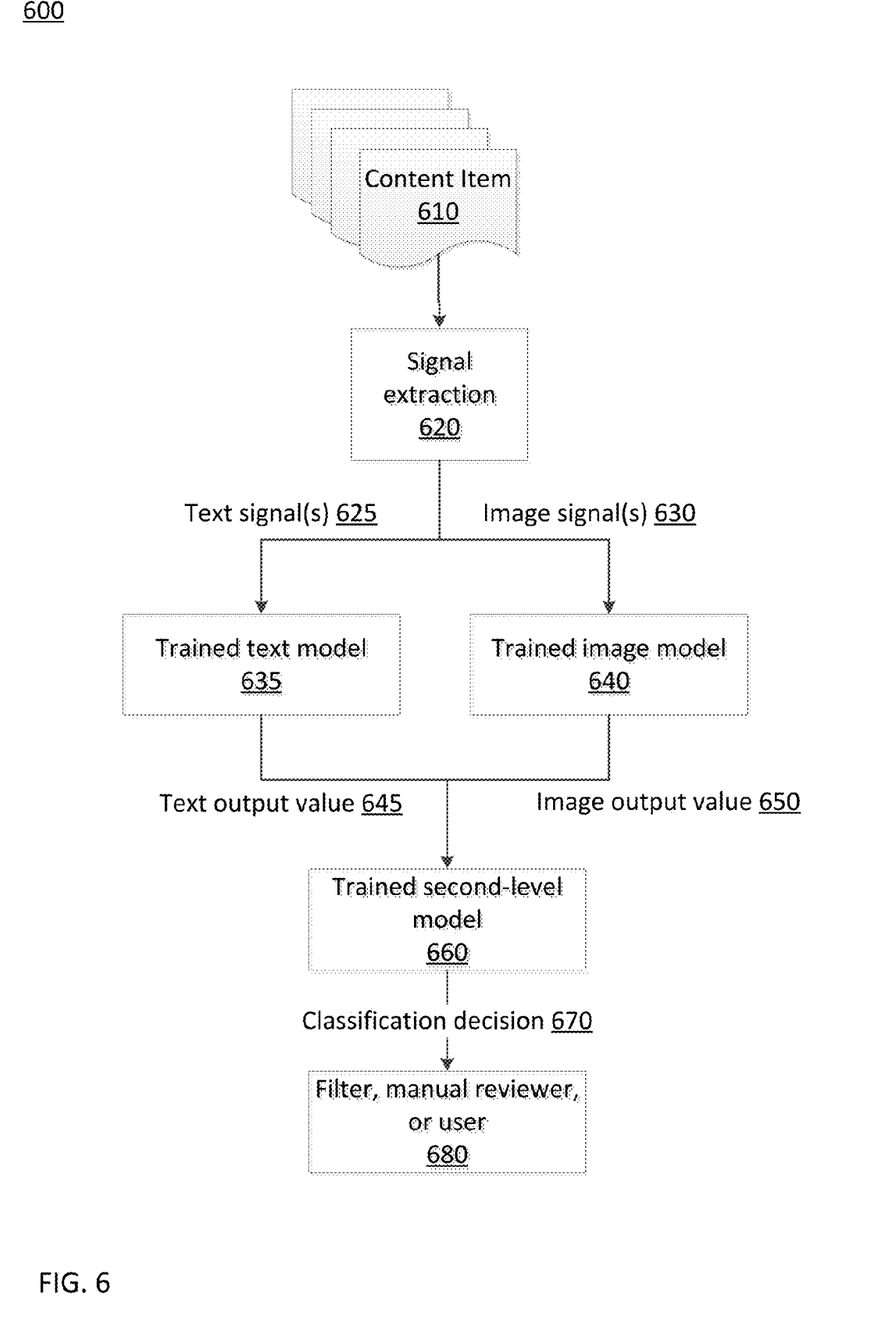
FIG. 6 illustrates a method of classifying an example content item using a two-tiered system comprising separate classification models.

FIG. 6 illustrates a method of classifying an example content item using a two-tiered system comprising separate classification models. The environment 600 consists of a content item 610, a signal extraction step 620, a text signal(s) 625, an image signal(s) 630, a trained text model 635, a trained image model 640, a text output value 645, an image output value 650, a trained second-level model 660, a classification decision 670, and a final action 680. First the content item 610, with unknown classification, undergoes the signal extraction process 620, resulting in the text signal(s) 625 and the image signal(s) 630. Each is then inputted into a specialized classifier model; the text signal(s) is inputted into the trained text model 635, while the image signal(s) is inputted into the trained image model 640. The text model 635 outputs the text output value 645 and the image model 640 outputs the image output value 650. The output values 635 and 640 are then combined and inputted into the second-level model 660. This model outputs the final classification decision 670. Based on this decision 670, the final action 680 is taken. This may include filtering the content item 610 if its classification decision 670 is NSFW, or forwarding it to a manual reviewer for further scrutiny. Alternatively, the content item 610 may be flagged and forwarded to a user. If the content item 610 is classified as SFW, then no action is taken and it is transmitted directly to the user.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for determining compliance of content with a content policy of the online system, the method comprising:
   receiving a content item comprising text and one or more images;
   extracting a plurality of text signals from the text;
   extracting a plurality of image signals from the one or more images;
   inputting the plurality of text signals and the plurality of image signals into a two-tier classifier system by inputting the plurality of text signals into a text classifier model of a first tier of the two-tier classifier system, inputting the plurality of image signals into an image classifier model of the first tier of the two tier-classifier system, and inputting output classifications of the text classifier model and of the image classifier model into a second-tier classifier model, the second-tier classifier model outputting a confidence value expressing a likelihood of compliance with a content policy of an online system;
   determining, based on the confidence value, a compliance classification of the content item.

2. The method of claim 1, wherein the text signals are extracted according to a "bag of words" methodology, discarding order and grammar but retaining word multiplicity.

3. The method of claim 1, wherein extracting the plurality of text signals comprises:
   detecting commonly appearing word pairs; and
   treating each word pair as a single text signal.

4. The method of claim 1, wherein the plurality of image signals comprises a quantitative measure of a portion of the one or more images having a color within a predefined range that is consistent with skin tones.

5. The method of claim 1, wherein the plurality of image signals comprises an indication that the one or more images contains a face.

6. The method of claim 1, wherein the plurality of image signals comprises text contained within the image.

7. The method of claim 1, wherein the classifier implemented is a Naïve-Bayes classifier.

8. The method of claim 1, further comprising:
   responsive to the compliance classification determined for the content item indicating a likelihood of violating the content policy, performing at least one remedial action of:
      blocking the content item from being transmitted or displayed to a user,
      passing the content item to a human controller for manual review, and
      marking the content item with a tag.

9. A computer program product for determining compliance of content with a content policy, the computer program product comprising a non-transitory computer-readable storage medium containing computer program code for:
   receiving a content item comprising text and one or more images;
   extracting a plurality of text signals from the text;
   extracting a plurality of image signals from the one or more images;
   inputting the plurality of text signals and the plurality of image signals into a two-tier classifier system by inputting the plurality of text signals into a text classifier model of a first tier of the two-tier classifier system, inputting the plurality of image signals into an image classifier model of the first tier of the two tier-classifier system, and inputting output classifications of the text classifier model and of the image classifier model into a second-tier classifier model, the second-tier classifier outputting a confidence value expressing likelihood of compliance with a content policy of an online system;

comparing the confidence value against a pre-defined threshold value; and based on the comparison, assigning a compliance classification to the content item.

10. The computer program product of claim 9, further comprising:

extracting the plurality of text signals according to a "bag of words" methodology, discarding word order and grammar but retaining word multiplicity.

11. The computer program product of claim 9, further comprising:

detecting commonly appearing word pairs; and treating each word pair as a single text signal.

12. The computer program product of claim 9, wherein the plurality of image signals comprises a quantitative measure of a portion of the one or more images having a color within a predefined range that is consistent with skin tones.

13. The computer program product of claim 9, wherein the plurality of image signals comprises an indication that the one or more images contains a face.

14. The computer program product of claim 9, wherein the plurality of image signals comprises text contained within the image.

15. The computer program product of claim 9, wherein the classifier implemented is a Naïve-Bayes classifier.

16. The computer program product of claim 9, further comprising:

responsive to the compliance classification determined for the content item indicating a likelihood of violating the content policy, performing at least one remedial action of:

blocking the content item from being transmitted or displayed to a user, passing the content item to a human controller for manual review, and marking the content item with a tag.

* * * * *